United States Patent
Griffith et al.

(10) Patent No.: US 10,168,515 B2
(45) Date of Patent: Jan. 1, 2019

(54) OPTICAL MAGNIFICATION DEVICE WITH A PAIR OF BISTABLE DEFORMABLE REFLECTORS

(71) Applicant: BAE SYSTEMS plc, London (GB)

(72) Inventors: Michael Stewart Griffith, Chelmsford (GB); David Andrew Cocksedge, Chelmsford (GB); Leslie Charles Laycock, Chelmsford (GB)

(73) Assignee: BAE Systems PLC, London (GB)

( * ) Notice: Subject to any disclaimer, the term of this patent is extended or adjusted under 35 U.S.C. 154(b) by 21 days.

(21) Appl. No.: 15/309,321

(22) PCT Filed: Feb. 5, 2015

(86) PCT No.: PCT/GB2015/050316
§ 371 (c)(1),
(2) Date: Nov. 7, 2016

(87) PCT Pub. No.: WO2015/170071
PCT Pub. Date: Nov. 12, 2015

(65) Prior Publication Data
US 2017/0059835 A1    Mar. 2, 2017

(30) Foreign Application Priority Data

May 7, 2014  (EP) ..................... 14275110
May 7, 2014  (GB) ..................... 1408027.9

(51) Int. Cl.
*G02B 17/06* (2006.01)
*G02B 26/08* (2006.01)

(52) U.S. Cl.
CPC ..... *G02B 17/0694* (2013.01); *G02B 17/0621* (2013.01); *G02B 26/0825* (2013.01)

(58) Field of Classification Search
None
See application file for complete search history.

(56) References Cited

U.S. PATENT DOCUMENTS 4,022,523 A * 5/1977 Lindonen ......... G02B 26/0825
                                              359/849
4,074,253 A    2/1978 Nadir
(Continued)

FOREIGN PATENT DOCUMENTS

DE  102008027518 B3   3/2010
WO       9845746     10/1998
WO    2015170071 A1  11/2015

OTHER PUBLICATIONS

International Search Report and Written Opinion received for Patent Application No. PCT/GB2015/050316, dated May 27, 2015. 10 pages.
(Continued)

*Primary Examiner* — Jennifer D. Carruth
(74) *Attorney, Agent, or Firm* — Finch & Maloney PLLC

(57) ABSTRACT

The following invention relates to an optical device for use in a system that requires optical zoom or focus abilities, particularly for providing pre-set zoom parameters with a very low energy requirement. There is provided an optical magnification device comprising at least one pair of optically aligned deformable reflectors, wherein each reflector pair has at least two configurations, wherein selection of a first and a second configuration of said deformable reflector pairs provides pre-defined magnification states, such that in any configuration one reflector is substantially concave and the other is substantially convex; at least one controller may cause both the reflectors to move between said at least two configurations.

20 Claims, 2 Drawing Sheets

(56) References Cited

U.S. PATENT DOCUMENTS

| | | | |
|---|---|---|---|
| 6,977,777 B1 | 12/2005 | Wick | |
| 7,986,465 B1 | 7/2011 | Lo et al. | |
| 2003/0107823 A1* | 6/2003 | Sekiyama | G02B 3/14 |
| | | | 359/726 |
| 2007/0109667 A1 | 5/2007 | Chiu | |

OTHER PUBLICATIONS

International Preliminary Report on Patentability received for Patent Application No. PCT/GB2015/050316, dated, Sep. 6, 2016. 7 pages.
GB Intellectual Property Office Search Report under Section 17(5) received for GB Patent Application No. 1408027.9 dated Nov. 12, 2014. 3 pages.
Extended European Search Report received for EP Patent Application No. 14275110.6 dated Sep. 17, 2014. 6 pages.

* cited by examiner

OPTICAL MAGNIFICATION DEVICE WITH A PAIR OF BISTABLE DEFORMABLE REFLECTORS

The following invention relates to an optical device for use in a system that requires optical zoom or focus abilities, particularly for providing pre-set zoom parameters with a very low energy requirement.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

According to a first aspect of the invention there is provided an optical magnification device comprising at least one pair of optically aligned deformable reflectors, wherein each reflector pair has at least two configurations, wherein selection of a first and a second configuration of said deformable reflector pairs provides pre-defined magnification states, such that in any configuration one reflector is substantially concave and the other is substantially convex; at least one controller may cause both the reflectors to move between said at least two configurations.

According to a further aspect of the invention there is provided an optical magnification device comprising at least one pair of optically aligned deformable reflectors, a controller for said deformable reflectors, wherein each reflector pair has at least two configurations, wherein selection of a first and a second configuration of said deformable reflector pairs provides pre-defined magnification states, such that in any configuration one reflector is substantially concave and the other is substantially convex, wherein the each deformable reflector pair comprises a first deformable reflector and a second deformable reflector, wherein the first deformable reflector is optically aligned with the second deformable reflector.

The optical alignment is such that there is a direct line of sight between the each deformable reflector pair, such that there is direct line of sight between the first deformable reflector and the second deformable reflector. The means of magnification may preferably only be caused by reflections between the each deformable reflector pair, such as, for example the first deformable reflector and the second deformable reflector.

The device according to the invention provides a facile means of providing pre-set i.e. predefined magnification states. The first configuration may be substantially magnification, and the second configuration may be substantially demagnification.

The at least two reflectors within the reflector pair may be selected to adopt at least two states, such as a first state and a second state, the selection of which will provide the desired magnification or demagnification. The reflectors are substantially identical, that they both comprise the same focal lengths concave $f_1$ and convex $f_2$. The first optical length and second optical length of the first and second state for the reflector are different, such that $f_2 \neq f_1$.

The reflector may be shaped to adopt any commonly used lens or reflector state, such as, for example, a simple lens shapes, such as, for example convex or concave, based on the radius of a sphere, or complex lens shapes such as, for example, aspherical, parabolic etc.

Depending on the selection of the configurations of the pair of reflectors, will provide either a magnification or demagnification output, i.e. M is either >1 or <1, the latter being demagnification.

The at least two deformable reflectors comprise a first deformable reflector and a second deformable reflector, wherein the first reflector has a first state with a first focal length $f_2$, and second state with a second focal length $f_1$, and the second reflector has a first state with a first focal length $f_2$, and second state with a second focal length $f_1$, such that in each configuration of said pair of reflectors, at least one reflector has a concave focal length $f_1$ and the other reflector a convex focal length $f_2$.

The state of said first deformable reflector and said second deformable reflector are preferably selected to provide one positive and one negative focal length, the reflectors in each pair may be located at distance (d) apart from each other, where $d \geq f_1 + f_2$. For afocal systems the distance d is equal to or substantially equal to $f_1 + f_2$, this may be used in systems such as, for example laser optics, where the final reflector may advantageously provide a substantially parallel beam, and hence provide a magnified or demagnified beam, without the formation of a focal point, to avoid air breakdown. For image based optics a focussed image is desirable hence the distance d is preferably greater than $f_1 + f_2$.

Therefore one pair of reflectors can provide two magnification settings M and 1/M where $$M = \frac{R_1}{R_2} = \frac{f_1}{f_2}$$

$R_1$ and $R_2$ are the radii of the curvature of the reflectors
$f_1$ and $f_2$ are the focal length of the reflectors Further pairs of reflectors may be used in series to provide finer steps in beam expansion/reduction, such as, for example three pairs with magnifications of 2, $2^{1/2}$ and $2^{1/4}$ respectively can provide the following fixed magnification steps $2^{7/4}$~3.4,
$2^{5/4}$~2.4
$2^{3/4}$~1.7
$2^{1/4}$~1.2
$2^{-1/4}$~0.84
$2^{-3/4}$~0.59
$2^{-5/4}$~0.42
$2^{-7/4}$~0.30

Thus with very simple optics systems a large number of pre-set magnification or demagnification states can be readily achieved.

The deformable reflectors may be manufactured from any material which is capable of exhibiting resilience and reflectance, such materials may be selected from metals, metal alloys or a deformable substrate with at least one reflective layer.

The deformable substrate may be reflective or non-reflective with at least one reflective layer. The non-reflective deformable substrate may be selected from a resilient polymer or plastic with at least one reflective surface coating thereon. The deformable substrate may be formed from multiple layers, such as a deformable metal layer with a further non reflective layer to provide the correct degree of movement to provide the desired focal lengths $f_1$ and $f_2$, and deposited on said non-reflective layer a further at least one reflective layer.

The deformable reflector may comprise a deformable substrate, such as a metal or alloy which may be further coated with at least one reflective layer, to provide an improved optical reflectance range. Preferably the at least one reflective layer is a different metal or metal alloy. The selection of metals such as, for example gold allows optical reflectance across a very broad optical range, such as for example from 350 nm to 12 microns.

In a preferred arrangement the deformable reflectors may be manufactured from a metal, particularly steels, which are capable of possessing at least one stress point, which is imparted by stamping, pressing, typically with a slight torque, commonly referred to as a sprung metal. The stress point provides the reflector with two states. Pressing or applying a force to the reflector causes it to move in and out of alignment with the original pre-worked material. The movement, in and out of line of the reflector from the original pre-worked state, corresponds to the first and second states. Movement between the two states may be heard as a sharp click. The reflectors depending on the number of stress points applied thereon, may be capable of adopting a plurality of states. The steel may be further coated with at least one reflective layer.

The controller causes movement of at the pair of deformable reflectors between each state. The deformable reflectors may be designed to have 2, 3, 4 or a plurality of states. However the controller, in order to provide the movement between 3, 4 or more states becomes increasingly complex, requiring fine control over the movements required to engage each state. Therefore in a highly preferred arrangement the deformable reflectors are bistable reflectors, such that they possess two stable states. in a bistable system when the reflector has moved between states there is substantially zero electrical power required to maintain each state. The use of only two stable states allows the controller to be robust and have only binary movements, essentially an on and off state.

The controller provides the movement of the first deformable reflector and the second deformable reflector. The controller provides the movement of each reflector between said first state and second state, this movement may be caused by the application of a force acting upon said pair deformable reflectors. The controller may act upon the pair of reflectors, or each reflector may have its own controller. There may be at least one controller. Each pair of deformable reflectors may have its own controller, or each reflector may have its own controller.

In a further arrangement the pair of reflectors may be operably linked, such that causing the first reflector to deform from a first state to a second state causes the concomitant deforming of the second reflector from its first to second state.

The controller may use any means which can flip the reflector between the at least two states, such as, for example a solenoid acting on a magnetised portion of the deformable reflector, a physical coupling to a solenoid, the application of a positive or negative pressure by means of a fluid to one of the surfaces of the reflector, more preferably a magnetic force applied to said deformable reflector. If the reflector is not susceptible to the forces of a magnetic field a small magnet may be attached to the reflector or its deformable substrate.

According to a further aspect of the invention there is provided an optical system, comprising at least one optical magnification device according to the invention.

The optical system may be part of a camera, detector system, any system which requires the use of an optical zoom, such as images, laser optics. The optical system may comprise further optical elements, to alter the visual output.

According to a yet further aspect of the invention there is provided a method of providing optical magnification, comprising the steps of providing a pair of deformable reflectors capable of forming at least two configurations, wherein a first deformable reflector is capable of adopting at least two states, wherein said states provide at least one positive and at least one negative focal length, and
a second deformable reflector capable of adopting at least two states, wherein said states provide at least one positive and at least one negative focal length, and causing said first and second deformable reflectors to be selected from at least one positive and at least one negative focal length.

An embodiment of the invention will now be described by way of example only and with reference to the accompanying drawings of which:—

Figure 1A:
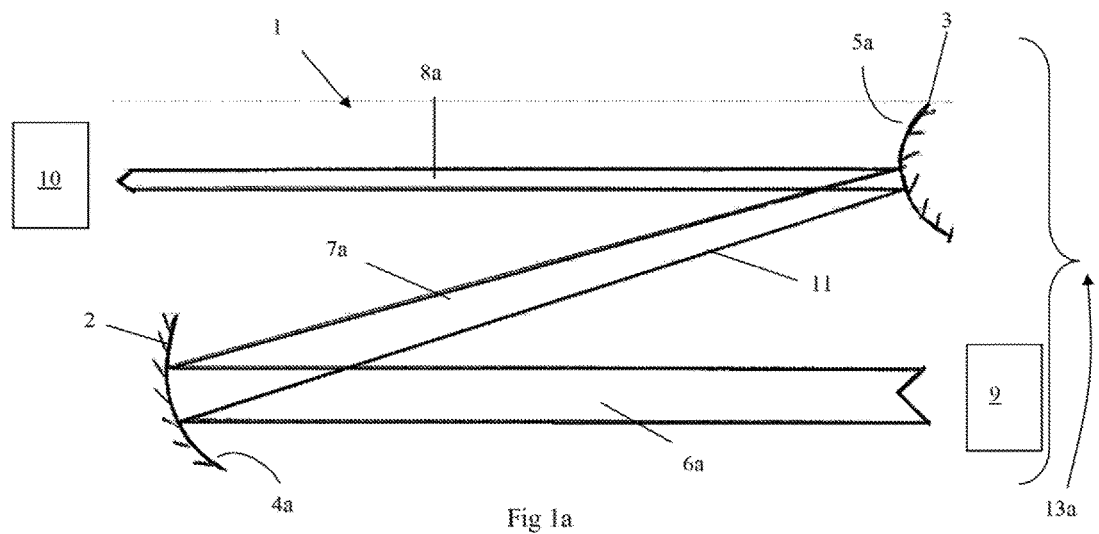
FIGS. 1a and 1b show ray diagrams with a pair of deformable reflectors in an afocal arrangement.
Figure 1B:
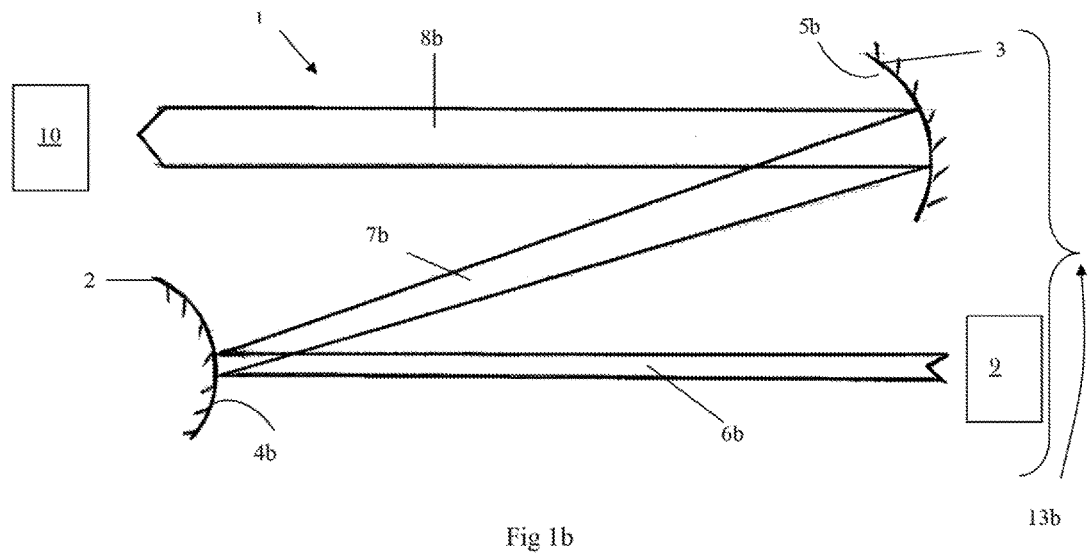

Turning to FIG. 1a there is provided an afocal magnification device 1, which is formed of a pair of deformable reflectors 2, 3. In FIG. 1a is a first configuration 13a, where the output 8a is an afocal demagnified image at the receiver 10. FIG. 1b is a second configuration 13b, where the output 8b is an afocal magnified image at receiver 10. The receiver 10 may be an observer, CCD, or other form of image capture device. The image 9 to be magnified maybe generated from a screen, or may be an image of surroundings or terrain.

In FIG. 1a, the light 6a from image 9 is reflected off of a first reflector 2, which has a first state 4a, generally a concave state. The action of the concave lens is to focus the beam 11, onto the second reflector 3. The first reflector 2 is optically aligned 7a, with a second reflector 3. The second reflector 3 is in a second state 5a, which is generally a convex state. The incoming focused beam 11 impinges on the second reflector 3, which is in a convex state which provides output beam 8a.

In FIG. 1b the light 6b from image 9 is reflected off of a first reflector 2, which has a second state 4b, generally a convex state. The action of the convex lens is to diverge the beam 11, onto the second reflector 3. The first reflector 2 is optically aligned 7b, with a second reflector 3. The second reflector 3 is in a first state 5b, which is generally a concave state. The incoming diverged beam 11 impinges on the second reflector 3, which is in a concave state which provides output beam 8b, which is a magnified output of image 9.

Figure 2A:
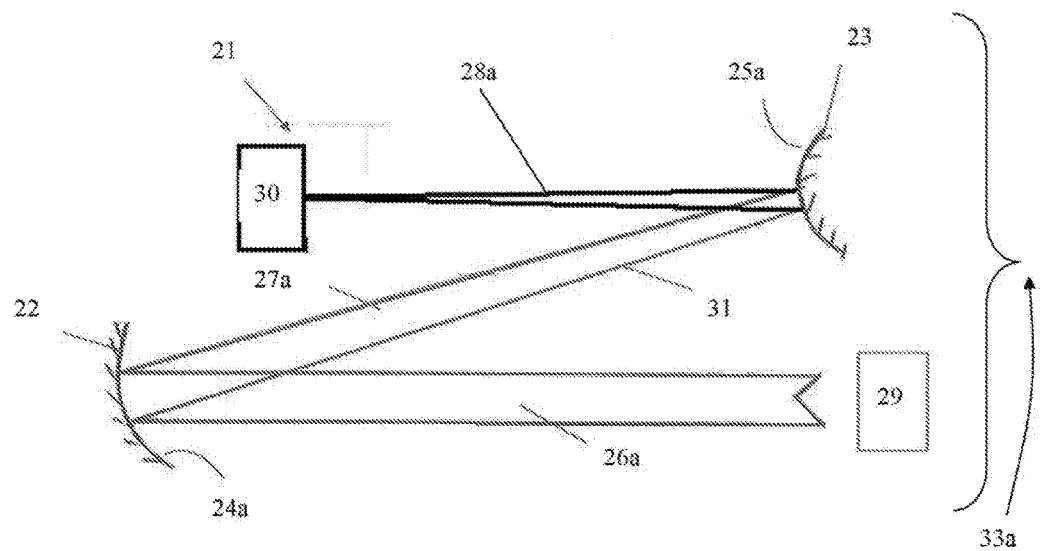
FIGS. 2a and 2b show ray diagrams with a pair of deformable reflectors in a focusable arrangement.
Figure 2B:
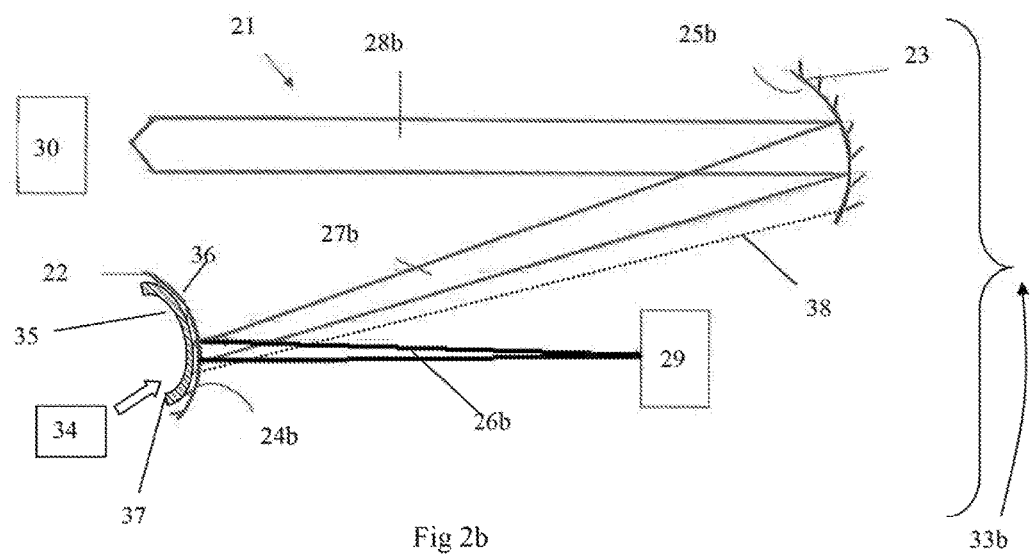

Turning to FIG. 2a there is provided a focussed magnification device 21, which is formed of a pair of deformable reflectors 22, 23. In FIG. 2a is a first configuration 33a, where the output 28a is a focussed demagnified image at the receiver 30. FIG. 2b is a second configuration 33a, where the output 28b is a focussed magnified image at receiver 30. The receiver 30 may be an observer, CCD, or other form of image capture device. The image 29 to be magnified maybe generated from a screen, or may be an image of surroundings or terrain.

In FIG. 2a, the light 26a from image 29 is reflected off of a first reflector 22, which has a first state 24a, generally a concave state. The action of the concave lens is to focus the beam 21, onto the second reflector 23. The first reflector 22 is optically aligned 27a, with a second reflector 23. The second reflector 23 is in a second state 25a, which is generally a convex state. The incoming focused beam 31 impinges on the second reflector 23, which is in a convex state which provides output beam 28a.

In FIG. 2b the light 26b from image 29 is reflected off of a first reflector 22, which has a second state 24b, generally a convex state. The action of the convex lens is to diverge the beam 31, onto the second reflector 23. The first reflector 22 is optically aligned 27b, with a second reflector 23. The second reflector 23 is in a first state 25b, which is generally a concave state. The incoming diverged beam 31 impinges on the second reflector 23, which is in a concave state which provides output beam 28b, which is a magnified output of image 29.

The reflector 22 is deformable substrate 35 with a reflective layer 36 located thereon. The deformable substrate 35 comprises a magnetic 37, such that when the controller 34, a solenoid, is activated is causes the deformable substrate 35 to flip between states 24a and 24b, i.e. concave to convex. The pair of deformable reflectors 22 and 23 may be operably linked 38 by a tether, such that movement of the reflector 22, causes the movement of the reflector 23.

The invention claimed is:

1. An optical magnification device comprising:
at least one pair of optically aligned deformable reflectors; and
a controller for said deformable reflectors;
wherein each reflector pair has at least two configurations,
wherein selection of a first and a second configuration of said one or more deformable reflector pairs provides pre-defined magnification states, such that in each pre-defined magnification state one reflector in a given one of the reflector pairs is substantially concave and the other reflector in the same reflector pair is substantially convex,
wherein said each deformable reflector pair comprises a first deformable reflector and a second deformable reflector,
wherein the first deformable reflector is optically aligned with the second deformable reflector,
wherein the pair of reflectors are operably linked, such that causing the first reflector to deform from a first state to a second state causes the concomitant deforming of the second reflector from its first to second state,
wherein the deformable reflectors are bistable reflectors configured to maintain both the first state and the second state while no force is applied on said deformable reflectors, and
wherein the reflectors in each pair are located at distance d apart from each other, where $d \geq f_1 + f_2$, $f_1$ is the focal length associated with the first state, and $f_2$ is the focal length associated with the second state.

2. The device according to claim 1, wherein the first configuration of the pair of reflectors is substantially magnifying, and the second configuration is substantially de-magnifying.

3. The device according to claim 1, wherein the first deformable reflector has its first state with a first focal length $f_2$, and second state with a second focal length $f_1$, and the second deformable reflector has its first state with a first focal length $f_2$, and second state with a second focal length $f_1$, such that in each configuration of said pair of reflectors, at least one reflector has a concave focal length $f_1$ and the other reflector a convex focal length $f_2$.

4. The device according to claim 1, wherein the first state of the first deformable reflector has a first focal length and the second state of the first deformable reflector has a second focal length, and the first state of the second deformable reflector has a first focal length and the second state of the second deformable reflector has a second focal length.

5. The device according to claim 1, wherein $d > f_1 + f_2$.

6. The device according to claim 1, wherein the at least two deformable reflectors are made from a metal, alloy or a resilient substrate with a reflective layer.

7. The device according to claim 6, wherein the at least one reflective layer is a metal or metal alloy.

8. The device according to claim 1, wherein said deformable reflectors are sprung reflectors.

9. The device according to claim 1, wherein the first state and the second state are caused by application of the force on said deformable reflectors.

10. The device according to claim 9, wherein the force is magnetic force applied to said deformable reflectors.

11. An optical system, comprising at least one optical magnification device according to claim 1.

12. The device according to claim 1, wherein the pair of reflectors are operably linked by a tether, such that the movement of one reflector in the pair causes the concomitant deformation of the other reflector in the pair.

13. A method of providing optical magnification using a pair of deformable reflectors, wherein the deformable reflector pair includes a first bistable reflector optically aligned with a second bistable reflector, and wherein the pair of reflectors are operably linked, such that causing the first bistable reflector to deform from a first state to a second state causes the concomitant deforming of the second bistable reflector from its first to second state, the method comprising:
causing said first and second bistable reflectors to concomitantly deform to a positive focal length and a negative focal length, respectively,
wherein the first bistable reflector and the second bistable reflector are each configured to maintain both the first state and the second state while no force is applied on said reflectors, the first bistable reflector located at distance d apart from the second bistable reflector, where $d \geq f_1 + f_2$, $f_1$ is the focal length associated with the first state, and $f_2$ is the focal length associated with the second state.

14. An optical magnification device comprising:
a pair of deformable reflectors, the pair including a first bistable reflector that is optically aligned with a second bistable reflector, wherein the first and second bistable reflectors are operably linked, such that causing the first bistable reflector to deform from a first state to a second state causes the concomitant deforming of the second bistable reflector from a first to a second state, the first bistable reflector and the second bistable reflector each configured to maintain both the first state and the second state while no force is applied on said reflectors, the reflectors in each pair located at distance d apart from each other, where $d \geq f_1 + f_2$, $f_1$ is the focal length associated with the first state, and $f_2$ is the focal length associated with the second state; and
a controller to select a configuration of the pair to provide a pre-defined magnification state, such that the first bistable reflector is one of concave and convex and the second bistable reflector is the other of concave and convex.

15. The device according to claim 14, wherein the controller is further to select from a plurality of configurations of the pair of deformable reflectors, the plurality including a first configuration that is substantially magnifying, and a second configuration is substantially de-magnifying.

16. The device according to claim 14, wherein the first state of the first bistable reflector has a positive focal length and the second state of the first bistable reflector has a negative focal length, and the first state of the second bistable reflector has a positive focal length and the second state of the second bistable reflector has a negative focal length.

17. The device according to claim 14, wherein the first and second bistable reflectors are made from a metal, alloy or a resilient substrate with a reflective layer.

18. The device according to claim 14, wherein said deformable reflectors are sprung reflectors.

19. The device according to claim 14, wherein each of the first and the second states is caused by application of a magnetic force on said bistable reflectors.

20. An optical system, comprising at least one optical magnification device according to claim 14.

* * * * *